United States Patent Office 3,287,902
Patented Nov. 29, 1966

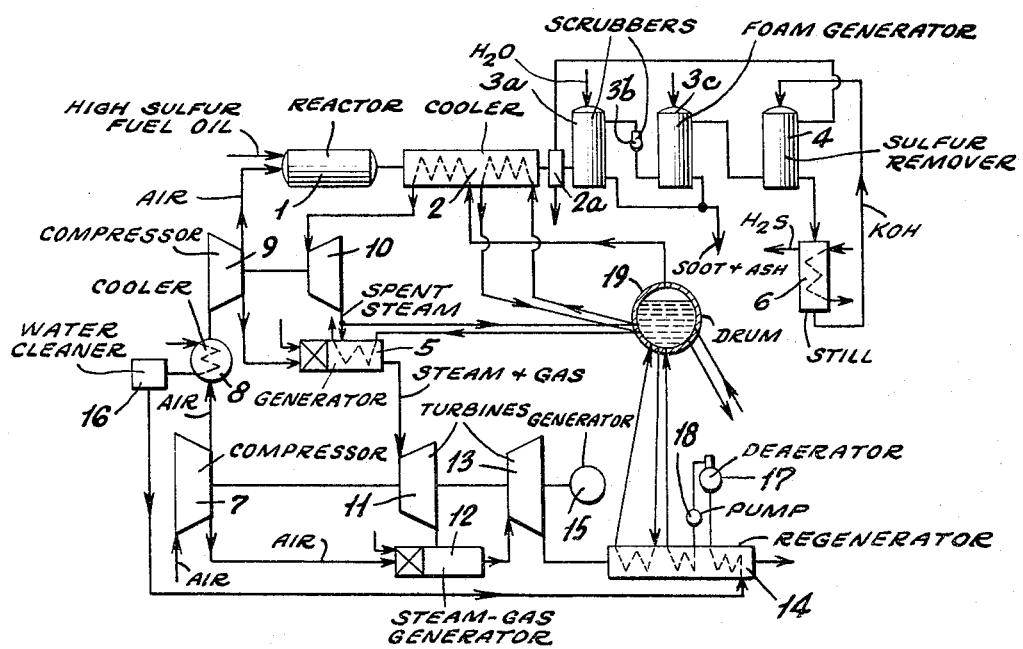

3,287,902
METHOD OF COMBUSTION OF HIGH-SULPHUR ASH FUELS AT THERMAL POWER STATIONS
Sergei Alexeevich Khristianovich and Viktor Mikhailovich Maslennikov, Novosibirsk, Vasily Sergeevich Frolov, Zhukovsky, Moisei Kusielevich Pismen, Moscow, Mark Ikhelevich Derbaremdiker, Ljubertsy, Alexei Pavlovich Andrianov, Moscow, Petr Mikhailovich Sharov, Shchekino, and Evgeny Alexeevich Fadeev, Novosibirsk, U.S.S.R., assignors to Institute Teoreticheskoi i prikladnoi Mekhaniki sibirskogo Otdelenia Akademii Nauk U.S.S.R., Novosibirsk, U.S.S.R.
Filed Mar. 16, 1965, Ser. No. 440,191
1 Claim. (Cl. 60—39.02)

The present invention relates to a method of combustion of high-sulfur ash fuels at thermal power plants, and more particularly, to a method of combustion of sulfide- and vanadium-containing residual fuel oils, as well as sulfur-bearing and ash coals at a pressure higher than atmospheric pressure.

At present high-sulfur ash fuels are burned in combustion chambers of thermal power plants for generation of high-pressure steam, with the result that products of combustion contain sulfurous anhydride and considerable amounts of ash.

The contamination of the outside air with sulfurous anhydride causes a reduction in the power of thermal stations. Besides, sulfurous anhydride causes the corrosion of the equipment. Removal of anhydride from stack gases is uneconomical and has not found a wide application. The presence of vanadium pentoxide in ashes also causes corrosion of the equipment.

Burning high-sulfur ash fuels in stationary gas-turbine and steam-gas power plants is a matter of some difficulty due to corrosion and clogging with ashes of turbine sections between inlet and outlet valves through which steam passes.

Attempts to prevent corrosion by adding into fuel various admixtures have not been successful so for, since this increases fuel ash content.

It is an object of the present invention to provide an economical method of combustion of high-sulfur ash fuel, which would make it possible to avoid corrosion of the equipment and contamination of the outside air with sulfurous anhydride.

The proposed method of combustion of high-sulfur ash fuels consists in that part of the air supplied to the power plant for the burning of fuel is used for complete gasification of the whole amount of initial fuel through its incomplete combustion at 1000–1500° C. and under pressure amounting to that of the power cycle or less; gasification products are cooled by the working substance of the power plant to the temperature required for gas cleaning, scrubbed of sulfur compounds and ash, and then afterburnt in power plant combustion chambers to provide for high temperature of the power plant working substance.

FIG. 1 is a schematic diagram of the plant, illustrating the method of combustion of fuel and FIG. 2 is a detailed diagram of the plant.

As shown, in FIGURE 1, compressed air is directed to reactor 1 to which all initial fuel is supplied. Due to incomplete combustion of fuel, the temperature generated in reactor 1 is about 1000–1500° C. and all fuel is converted to gas composed mainly of carbon monoxide, hydrogen and nitrogen.

In this case, sulfides contained in the fuel are converted mainly into hydrogen sulfide, whereas corrosion-causing vanadium pentoxide does not form at all, as under these conditions it is readily reduced into one of its lower oxides, e.g. $V_2O_3$.

Hot products of gasification are supplied to gas condenser 2, where they are cooled by the working substance of the power plant.

Cooled gasification products are delivered to apparatus 3 serving for cleaning the gas of vanadium-containing soot and ash and are further fed to apparatus 4 where sulfur containing compounds are extracted from gas with the help of a sorbing agent, after which the recovered products are processed into sulfur or sulfuric acid while cleaned products of gasification are directed for afterburning to chamber 5, to which the greater part of compressed air is supplied.

The products of combustion produced in chamber 5 are then used for obtaining a high-temperature working substance of the power plant.

The proposed method of consuming high-sulfur ash fuels at thermal power plants makes it possible to avoid contamination of the outside air with sulfurous anhydride and, consequently, to design high-power thermal stations, to eliminate corrosion of the equipment and to obtain fuel combustion products containing no ash, which, in turn, contributes to development of stationary steam-gas and gas turbine power plants operating on high-sulfur ash fuels.

Expenditure on cleaning gasification products of sulfides and ash is justified by the cost of manufactured sulfur or sulfuric acid.

The present invention is described in connection with an example of the preferable realization of a method of burning high-sulfur ash fuels in a steam-gas turbine power plant. Shown in FIG. 2 is a detailed diagram of such a plant.

Part of the air compressed to 30 kg./sq. cm. by means of compressors 7 and 9 and intermediate cooler 8 is fed to reactor 1 which is also supplied with high-sulfur fuel oil.

Oxidation and complete gasification of fuel oil takes place in reactor 1. Gasification products are cooled in gas condensers 2 and 2a, with heat of gasification products being used in gas condenser 2 for generation and superheating of high-pressure steam, and in gas condenser 2a for heating cleaned gasification products.

Cooled gasification products are scrubbed with water in scrubber 3a and fine-cleaned of soot and vanadium-containing ash in tube spray 3b and in foam generator 3c. Cleaned of soot and ash, gasification products enter apparatus 4 for sulfur extraction, where they are washed with potash solution. The saturated potash is reclaimed in distillation tower 6 from which concentrated hydrogen sulfide is piped for production of sulfur or sulfuric acid.

Cleaned of sulfides and ash, gasification products are supplied to steam-gas generator 5, in which they are afterburnt at a pressure of nearly 30 kg./sq. cm. Said generator is also supplied with spent steam exhausted from turbine 10 and mixed in said generator 5 with products of combustion. Steam-gas mixture heated to 750° C. is transmitted into turbine 11, after which it is superheated again to 750° C. in low-pressure steam-gas generator 12 as a result of mixing cleaned gasification products with products of combustion.

Compressed air for afterburning of cleaned products of gasification is fed to steam-gas generator 12 from compressor 7.

The overheated gas-steam mixture is then directed to turbine 13, passes via generator 14, and is discharged to the atmosphere. Steam-gas turbines 11 and 13 operate compressor 7 and generator 15.

Water is supplied into the power plant through intermediate cooler 8 and chemical water cleaning system 16 to the tail section of regenerator 14 where it cools exhausted gases, and further, via deaerator 17 with the help of pump 18 it is supplied to drum 19.

Although the present invention has been described in connection with the preferred embodiment thereof, it is apparent that some modifications and alterations may occur without departing from the spirit and scope of the invention and the appended claim.

What is claimed is:

A method of combustion of high sulfur ash fuels at thermal power plants comprising:

partially oxidizing the entire amount of initial fuel at temperatures between 1000 and 1500° C. under pressure up to the maximum pressure of the power generation cycle, said oxidizing being accomplished using a part of the air required for complete burning, and resulting in complete gasification of the initial fuel with conversion of the organic sulfur compounds present in said initial fuel to hydrogen sulfide;

cooling the resulting gasification products by indirect heat exchange with a portion of the working medium of the power plant to a temperature sufficient to permit the removal of sulfurous compounds, soot and ash;

separating the sulfurous compounds, soot and ash from the cooled gasification products; and subsequently further oxidizing the cleaned gasification products to produce a high temperature working fluid for said power plant.

References Cited by the Examiner
UNITED STATES PATENTS 2,569,846  10/1951  Cornell _____ 158—117.5 X
2,975,594   3/1961  Eastman _____ 158—117.5 X JAMES W. WESTHAVER, *Primary Examiner.*